(12) United States Patent
Brewer

(10) Patent No.: US 6,268,005 B1
(45) Date of Patent: Jul. 31, 2001

(54) SHEETER WIRE APPARATUS

(75) Inventor: Marvin Vincent Brewer, Frisco, TX (US)

(73) Assignee: Recot, Inc., Pleasanton, CA (US)

( * ) Notice: Subject to any disclaimer, the term of this patent is extended or adjusted under 35 U.S.C. 154(b) by 0 days.

(21) Appl. No.: 09/368,441

(22) Filed: Aug. 4, 1999

(51) Int. Cl.[7] .............................. A21C 3/02; A21D 6/00
(52) U.S. Cl. ...................... 426/502; 426/389; 425/136; 425/223; 425/230; 425/310; 425/363; 425/436 RM; 242/412.1; 242/420; 242/420.5; 242/421.4
(58) Field of Search ...................... 425/136, 223, 425/227, 229, 230, 310, 363, 436 R, 436 RM; 264/310; 426/502, 503, 389; 242/412, 412.1, 412.2, 412.3, 414.1, 420, 420.5, 421.4

(56) References Cited

U.S. PATENT DOCUMENTS

| | | |
|---|---|---|
| 4,171,198 | 10/1979 | Jimenez . |
| 4,348,166 | 9/1982 | Fowler . |
| 4,966,541 * | 10/1990 | Mistretta ........................ 425/229 |
| 5,498,148 | 3/1996 | Ouellette . |
| 5,558,885 | 9/1996 | Herrera . |
| 5,565,220 | 10/1996 | Rubio . |
| 5,571,549 | 11/1996 | Ouellette . |
| 5,576,033 | 11/1996 | Herrera . |
| 5,580,583 | 12/1996 | Caridis . |
| 5,662,949 | 9/1997 | Rubio . |
| 5,720,990 | 2/1998 | Lawrence . |
| 5,779,370 | 7/1998 | Schroeder . |
| 5,811,137 | 9/1998 | Clark . |
| 6,159,518 * | 12/2000 | Wilson ............................ 426/502 |

FOREIGN PATENT DOCUMENTS

869726 * 4/1971 (CA) .

* cited by examiner

*Primary Examiner*—Nam Nguyen
*Assistant Examiner*—Donald Heckenberg
(74) *Attorney, Agent, or Firm*—Colin P. Cahoon; Carstens, Yee & Cahoon

(57) ABSTRACT

An improved sheeter wire device providing constant tension on a feeder spool even during wire breakage. A constant speed motor draws wire across the face of the sheeter while a drag motor maintains constant tension on the wire. A pair of pinch rollers prohibits unwinding of the feeder spool in the event of wire breakage.

13 Claims, 2 Drawing Sheets

SHEETER WIRE APPARATUS

BACKGROUND OF THE INVENTION

1. Technical Field

The present invention relates to an improved sheeter wire apparatus and, in particular, to a sheeter wire apparatus which provides for a continuous advancement of sheeter wire using a simple design that provides constant tension on the feed spool even during wire breakage. This is accomplished by the use of a drag motor connected to the supply spool, a constant speed motor connected the take-up spool, and a feed spool tension device.

2. Description of Related Art

A sheeter is a device commonly used in the food industry for making flattened food products, such as tortilla chips, in a continuous processing operation. Typically, a dough product is compressed between a pair of counter rotating sheeter rollers that are located closely together, thereby providing a pinch point through which the dough is formed into sheets. The dough can then be cut by, for example, a cutting roller to form the shape of the product desired.

Many dough products, particularly those that are corn based ("masa"), have a tendency to stick to the sheeter rollers rather than dropping onto a conveyer for transportation to the next processing step, such as a baking oven. One common approach to this problem is to string a stripper wire across the face of the sheeter roller so that the stripper wire can scrap away the dough product off of the surface of the roller.

An example of a prior art design in this regard is illustrated by FIG. 1. FIG. 1 is a perspective view of the output of a dough sheeter device 110. The cut dough product, in this case uncooked tortilla chips 120 made from masa, can be seen on a conveyer 130 after being deposited on the conveyer 130 by a sheeter roller 140. The sheeter roller 140 will typically have plurality of plastic bands 150 about the circumference of the sheeter roller 140. These bands 150 ride in groves (now shown) in the sheeter roller 140 and hold the sheeter wire 160 close to the surface of the sheeter roller 140. The bands 150 also provide a surface for returning ribbons of unused masa to the sheeter 110. A sheeter wire 160 is shown strung across the face of the sheeter roller 140. This sheeter wire 160 is attached to two fixed points 170, 180 and is threaded across the face of the sheeter roller 140 underneath each of the bands 150. This provides a flush contact between the sheeter wire 160 and the surface of the sheeter roller 140.

Also shown is a tension device 190, which can be a hydraulic or pneumatic device that provides a constant tension on the wire 160. This tension device 190 is typically connected to a warning device to provide an indication of wire breakage. Alternatively, the tension device 190 can also act as the second fixed point, thereby eliminating the post 180 shown in FIG. 1. FIG. 1 shows the sheeter wire 160 on the front or open side of the sheeter roller 140. The sheeter wire 160 can also be located in the same relative vertical position but on the back, or concealed, side of the roller 140.

The sheeter wire 160 is typically commercial piano wire. A typical tension on the wire during operation is 100 to 125 pounds. Contact with hardened masa, particularly during start-up, can subject the sheeter wire 160 to higher tension for short time periods. During operation the wire is also subject to friction from the moving face of the sheeter roller 140. The wire 160 must be replaced periodically or it is prone to breakage after time. In fact, in a continuous use operation for a typical sheeter device producing tortilla chips, it has been observed that such fixed sheeter wire 160 will break, if not replaced, nearly daily.

In order to replace a broken sheeter wire 160 the entire sheeter device 110 and, consequently, the entire chip processing assembly, must be stopped. The old sheeter wire 160 is removed. A new sheeter wire 160 is attached to the first attaching point 170, strung across the face of the sheeter roller 140 under the bands 150, and attached to a second attaching point 180. Then the tension device 190 must be reactivated. Raw material is lost because the dough that was on the sheeter must be thrown away and additional product downstream my need to be discarded. In addition, line start-up procedures must be initiated, which usually results in the loss of further product. A wire breakage event, therefore, results in a substantial amount of unscheduled downtime and lost product. The alternative is to schedule, on a daily basis, the replacement of the sheeter wire 160. A scheduled replacement of the sheeter wire 160, however, results in even more frequent, although scheduled, downtime.

One attempt at addressing the wire breakage problem is reflected in U.S. Pat. No. 5,720,990 ("Lawrence") issued on Feb. 24, 1998. The Lawrence patent discloses a wire separator system for a sheeter device comprising a motor that drives a feed spool and a motor that drives a take-up spool. Tension is maintained on the sheeter wire by use of a tension sensing pulley providing input to a controller which modulates the torque on the take-up reel. Provided that the wire does not unexpectedly break, the Lawrence patent discloses a device that will allow the sheeter to run for long periods of time without the necessity of stopping the sheeter to replace the sheeter wire, because new wire is constantly drawn across the contact surface.

The invention disclosed by Lawrence has several drawbacks, however. First, the design assumes that the wire will not break during operation. Unfortunately, this is not a safe assumption. In fact, it is not an infrequent occurrence that wire breakage occurs on the prior art model illustrated by FIG. 1 shortly after a new wire has been installed. This could occur due to a sudden contact with a dried piece of dough that has become affixed to the sheeter while the sheeter is stationary. Further, an initial steady-state friction between the sheeter wire and the sheeter must be overcome at the instant the sheeter begins to rotate. Since the Lawrence device provides that one motor feeds wire while another motor takes-up wire, a breakage between the two motors can result in the continued feeding of wire into the sheeter until the feed motor comes to a stop. A breakage also results in a loss of tension on the feed spool and can lead to unraveling or the "weed eater" effect, whereby the spool becomes unwound. Further, the Lawrence device is designed to maintain constant tension of the wire by using a variable speed pulling motor connected to the take-up reel. Since the Lawrence feed spool is connected to a fixed speed motor, the tension will necessarily fluctuate at the point that the wire is leaving the feed spool when, for example, the wire encounters a piece of dried dough product on the sheeter during operation. These torque fluctuations could effect the consistency of the feed spool's wound tension, thereby leading to further torque fluctuations and potential feed problems.

Consequently, a need exists for an improved continuous sheeter wire apparatus that maintains a constant tension on the feed spool even during wire breakage. This apparatus should be designed, in a fail safe way, to avoid driving sheeter wire into the sheeter after a wire breakage. The improved apparatus should also be of a relatively simple design with a minimum number of necessary and washable components.

SUMMARY OF THE INVENTION

The proposed invention comprises an improved continuous sheeter wire apparatus that uses a drag motor to control constant tension on the feed spool and a constant velocity motor driving the take-up spool. The invention also incorporates pinch rollers on the feed spool to insure that, even during wire breakage, constant tension is maintained.

In use, the constant speed motor pulls wire onto the take-up spool. Constant tension is maintained on the sheeter wire by the torque of the drag motor connected to the feed spool. Since tension is controlled at the feed end of the device, as opposed to the take-up end, minor tension fluctuations will be experienced by the take-up spool as opposed to the feed spool. This keeps the wire wound consistently on the feed spool. Since, in the event of wire breakage, the wire on the take-up spool will be discarded, winding variations due to minor tension variations on the take-up spool are inconsequential.

In the event of wire breakage, there is no possibility of feed wire being driven into the sheeter, since the feed spool is connected to a drag motor. A loss of torque on the drag motor is sensed and the entire sheeter assembly is shut down. Further, pinch rollers insure that there is no loss of tension on the feed spool itself, thereby avoiding unraveling of this spool or the "weed eater" effect.

The above as well as additional features and advantages of the present invention will become apparent in the following written detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Figure 2:
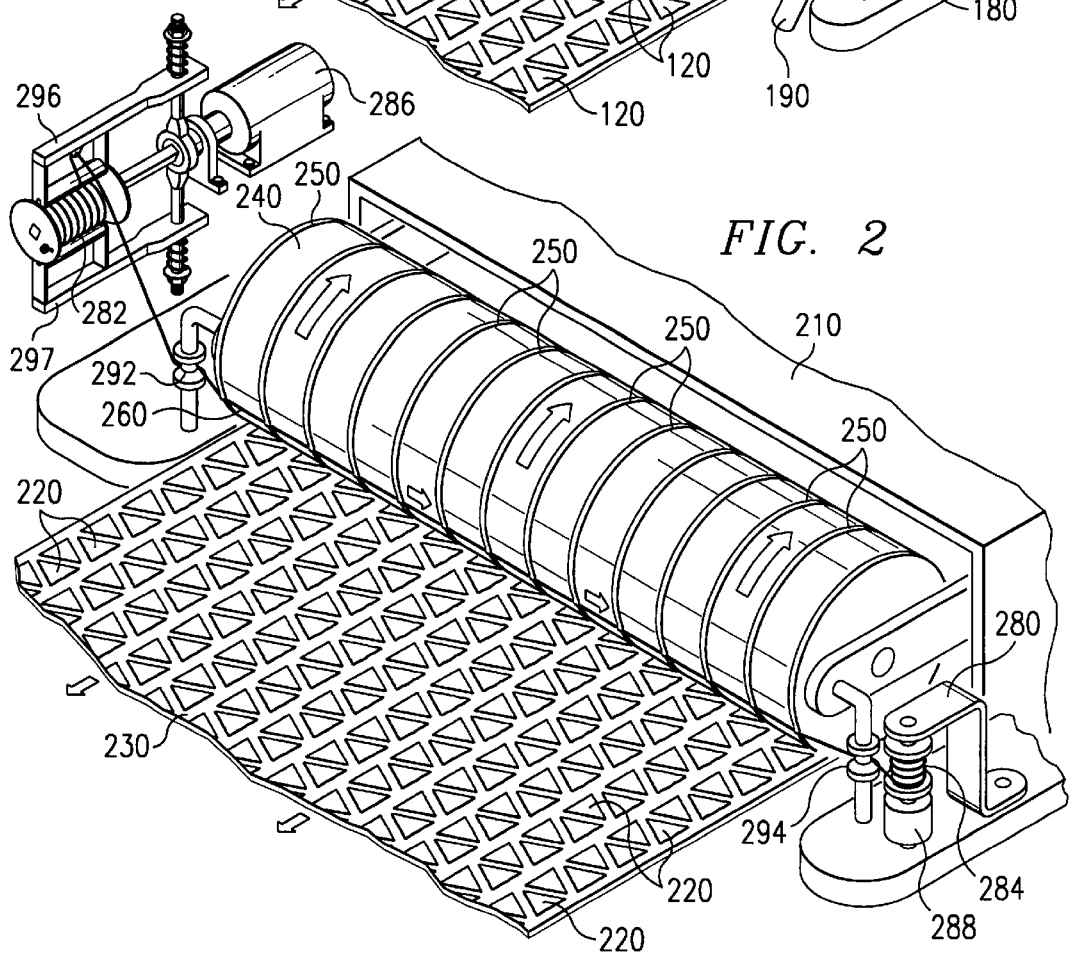
FIG. 2 is a perspective representation of one embodiment of the invention.

FIG. 2 shows one embodiment of the present invention installed on a sheeter device 210. Shown are the bands 250, sheeter roller 240, conveyer 230, and a resultant product 220. Rather than affixing the sheeter wire 260 in a stationary position, however, the present invention provides for a constant speed motor 288 which reels the sheeter wire 260 onto a take-up spool 284. The sheeter wire 260 is dispensed from a feed spool 282, which is connected to a drag motor 286. The drag motor 286 is set for a specific constant torque which insures that the tension on the sheeter wire 260 is always constant near the feed spool 282. From the feed spool 282, the sheeter wire 260 is threaded past a post or pulley 292. As with prior art designs, the sheeter wire 260 is then strung across the face of the sheeter roller 240 by threading the sheeter wire 260 under the several bands 250. The sheeter wire 260 is then strung across a second post or pulley 294 before being attached to the take-up spool 284. FIG. 2 also shows two opposed pinch rollers 296, 297, which are addressed in more detail in FIG. 4.

Figure 1:
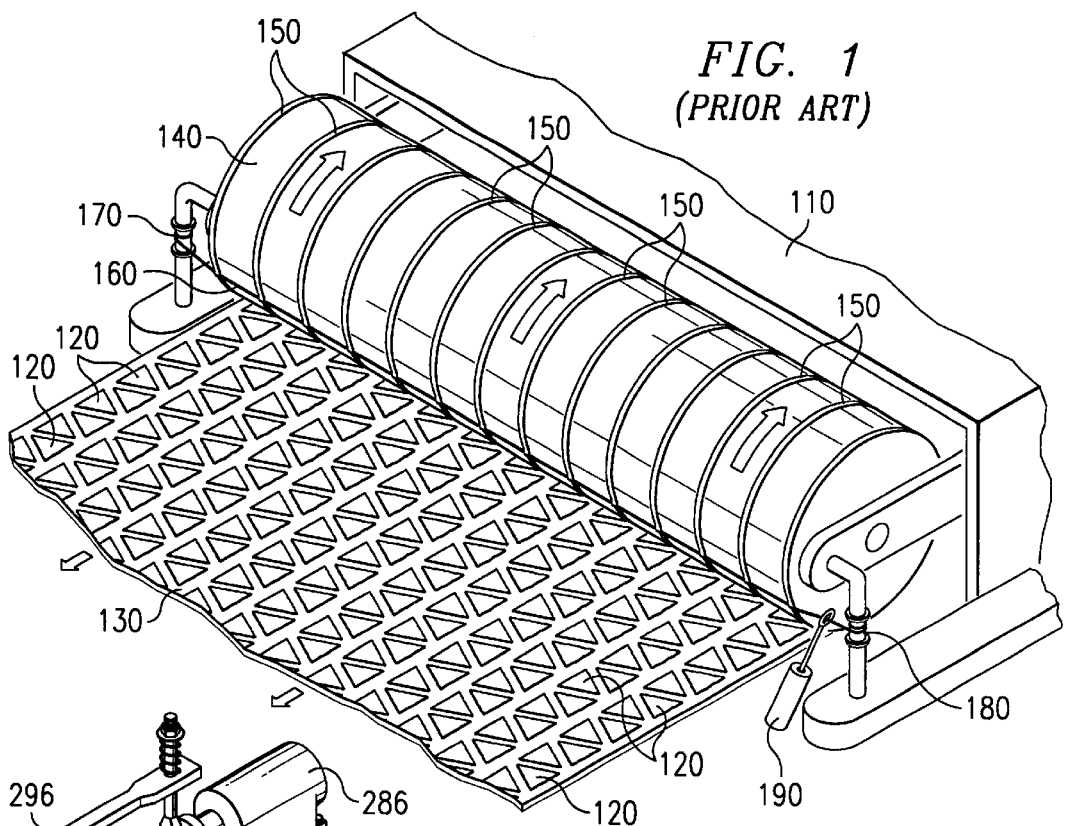
FIG. 1 is a perspective representation of a prior art sheeter device with a fixed sheeter wire.
Figure 3:
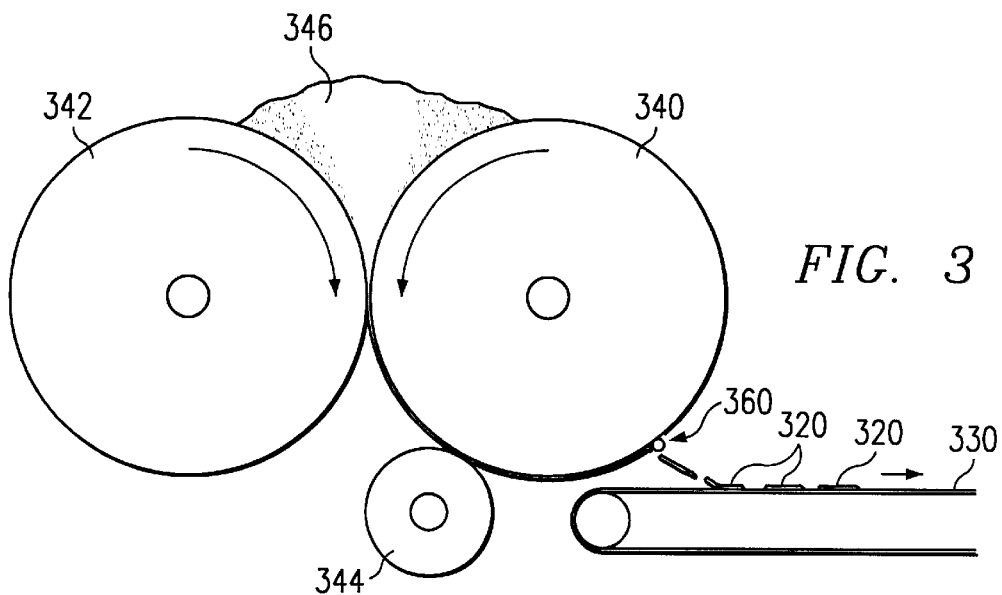
FIG. 3 is a schematic side view representation of one embodiment of the invention; and, FIG. 4 is a perspective view of the feeder spool and spool tension device of the invention.
Figure 4:
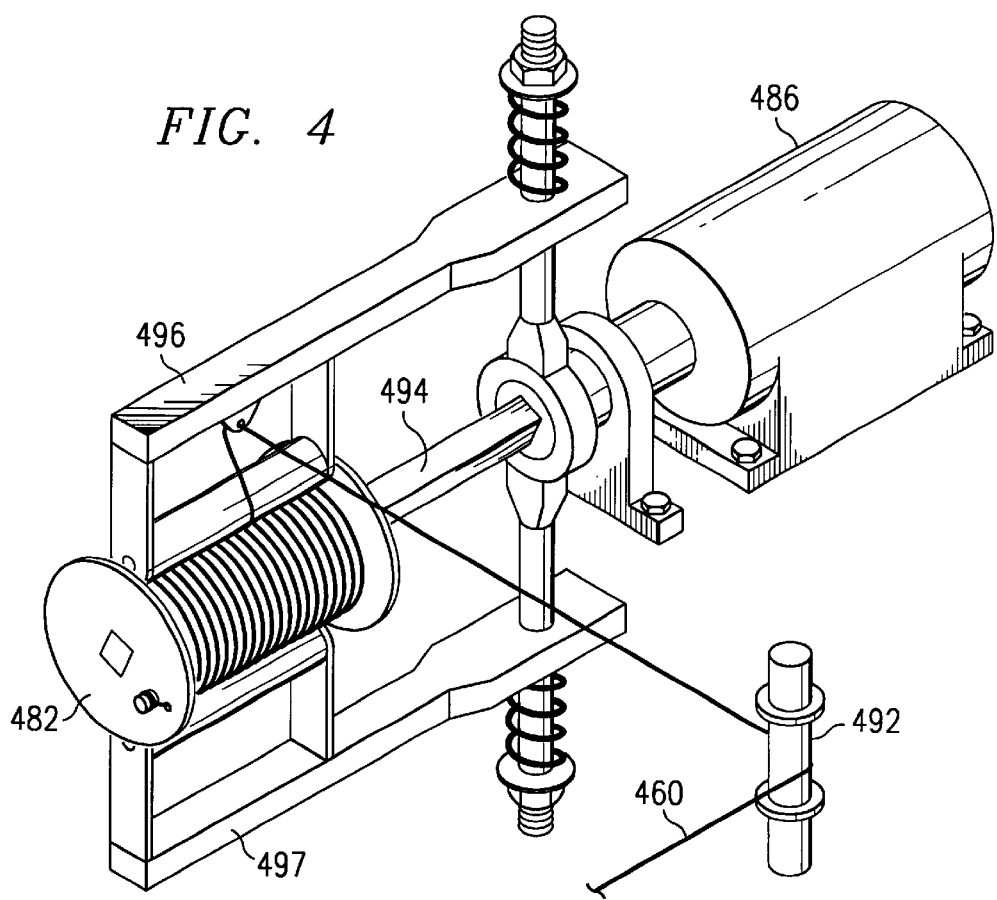

FIG. 3 is a schematic side view of the present invention in operation in conjunction with a sheeter device. Masa 346 is fed between a press roller 342 and the sheeter roller 340. The press roller 342 turns at a slower rotational speed than the sheeter roller 340. This results in the masa adhering to the sheeter roller 340. The masa 346 is next cut by a cutter roller 344. The cut masa is then stripped from the sheeter roller 340 by the sheeter wire 360, which is being slowly pulled across the face of the sheeter roller 340. The cut product 320 then drops onto a conveyer 330 to be transported for further processing. As with the prior art devices illustrated in FIG. 1, the location of the sheeter wire 360 can be on the front of the sheeter roller 340 (as illustrated) or on the back of the sheeter roller 340 immediately downstream of the cutter roller FIG. 4 illustrates one embodiment of a pinch roller design that provides a constant tension on the feed spool in the event of wire breakage. The feed spool 482 is mounted on a shaft 494 connected to the drag motor 486. Two spring-loaded pinch rollers 496, 497 are then placed in pressure contact with the feed spool 482. As the sheeter wire 460 is dispensed from the feed spool 482, the pinch rollers 496, 497 ride along the surface of the feed spool 482. If the sheeter wire 460 were to break, the drag motor 486 would stop and the sheeter wire 460 would be held in place on the feed spool 482, thereby prohibiting unraveling of the feed spool 482 by the stationary pinch rollers 496, 497.

The feed spool 482 can be removed from the shaft 494 by spreading apart the pinch rollers 496, 497 and pulling the feed spool 482 off of the shaft 494. It should be understood that while the embodiment illustrated in FIG. 4 shows two pinch rollers 496, 497, it is contemplated that the invention might utilize any number of roller designs, including a single stationary roller riding on the surface of the wire wound around the feed spool 482, as long as the design provides adequate pressure on the surface of the feed spool 482 while also allowing the sheeter wire 460 to be dispensed from the feed spool 482 during continuous operation.

As can be seen by FIG. 2, the invention is simple in design and in use. Using a drag motor 286 to regulate tension on the feed spool 282 is a fail safe method of insuring that the sheeter wire 260 will not be fed into the sheeter 210 in the event of a wire breakage event. The drag motor 286 is electrically connected to a controller (not shown). When the controller senses that there is no longer any torque force applied to the drag motor 286, as is the case in the event of wire breakage, the controller stops the sheeter device 210 and the pull motor 288. The pinch roller 296, 297 design insures that the feed spool 282 will never come unraveled regardless of the mode of operation or whether the sheeter wire 260 breaks.

In order to be compatible with use in the food industry which requires frequent antiseptic cleaning, it is recommended that as many as possible of the components disclosed be made of stainless steel. For example, the two posts 292, 294 can be simple stainless steel rods. A suitable motor for both the drag motor 280 and the pull motor 288 is the Bulletin 1326 Servo Motor manufactured by Allen Bradley. This motor is operated in the "torque mode" when used as a drag motor 286 and the "velocity mode" when used as a pull motor 288. The use of a single motor compatible for use as either the drag motor 286 or pull motor 288 facilitates a smaller spare parts inventory. The sheeter wire 260 is again commercially available piano wire which is wrapped to a set tension on the feed spool 282 prior to installation for use with the invention.

This invention is an improvement over the prior art in that it is a simple, fail safe design improving upon the concept of a continuous sheeter wire apparatus.

While the invention has been particularly shown and described with reference to a preferred embodiment, it will be understood by those skilled in the art that various changes in form and detail may be made therein without departing from the spirit and scope of the invention.

What is claimed is:

1. A sheeter wire device for use with a sheeter, said sheeter comprising at least one sheeter roller, said sheeter wire device comprising:

a drag motor;

a spool of wire connected to said drag motor; and a constant speed motor connected to wire pulled from said spool and pulled across the sheeter roller.

2. The sheeter wire device of claim 1 further comprising:

a tension device in contact with said spool.

3. The sheeter wire device of claim 2 wherein the tension device comprises at least one stationary pinch roller.

4. The sheeter wire device of claim 2 wherein the tension device keeps the spool from unwinding in the event of a wire breakage.

5. The sheeter wire device of claim 1 further comprising:

a controller electrically connected to said drag motor for controlling the constant speed motor and sheeter in the event of a wire breakage.

6. A continuous sheeter wire apparatus for use with a sheeter, said sheeter comprising at least one sheeter roller, said continuous sheeter wire apparatus comprising:

a feed spool wrapped with wire;

a drag motor connected to said feed spool;

a take-up spool for receiving wire pulled from the feed spool and pulled across the sheeter roller; and a constant speed motor connected to said take-up spool.

7. The apparatus of claim 6 further comprising:

at least one stationary roller in tension contact with the wire wrapped on said feed spool.

8. The apparatus of claim 6 further comprising:

a controller for monitoring the torque on said drag motor.

9. The apparatus of claim 8 wherein the controller shuts down a sheeter and said constant speed motor when the controller senses a drop in torque on said drag motor.

10. A method for continuously drawing a sheeter wire across a sheeter, said method comprising the steps of:

a) attaching a spool of wire to a drag motor;

b) placing the wire from said spool in contact with a sheeter roller;

c) attaching said wire to a constant speed motor; and d) pulling said wire with the constant speed motor from said spool and across the sheeter roller.

11. The method of claim 10 wherein the wire on the spool of step (a) is held in constant tension on said spool by at least one opposing roller.

12. The method of claim 10 further comprising the steps of:

e) monitoring the torque on the drag motor.

13. The method of claim 12 further comprising the steps of:

f) controlling the sheeter and the constant speed motor based on the monitored torque on the drag motor.

* * * * *